United States Patent
Priyanto et al.

(10) Patent No.: US 12,323,946 B2
(45) Date of Patent: Jun. 3, 2025

(54) METHODS FOR HANDLING POSITIONING OF A WIRELESS DEVICE AND RELATED NETWORK NODES AND WIRELESS DEVICE

(71) Applicant: Sony Group Corporation, Tokyo (JP)

(72) Inventors: Basuki Priyanto, Lund (SE); Johan Hill, Lund (SE)

(73) Assignee: Sony Group Corporation, Tokyo (JP)

(*) Notice: Subject to any disclaimer, the term of this patent is extended or adjusted under 35 U.S.C. 154(b) by 548 days.

(21) Appl. No.: 17/770,960

(22) PCT Filed: Nov. 3, 2020

(86) PCT No.: PCT/EP2020/080779
§ 371 (c)(1),
(2) Date: Apr. 21, 2022

(87) PCT Pub. No.: WO2021/089524
PCT Pub. Date: May 14, 2021

(65) Prior Publication Data
US 2022/0386268 A1    Dec. 1, 2022

(30) Foreign Application Priority Data
Nov. 8, 2019 (SE) .................................. 1951293-8

(51) Int. Cl.
*H04W 64/00*    (2009.01)
*G01S 5/02*    (2010.01)
(Continued)

(52) U.S. Cl.
CPC ......... *H04W 64/003* (2013.01); *G01S 5/0236* (2013.01); *H04L 5/0048* (2013.01); *H04W 72/0453* (2013.01)

(58) Field of Classification Search
CPC ........... H04W 64/003; H04W 72/0453; H04W 64/006; H04W 4/023; G01S 5/0236;
(Continued)

(56) References Cited

U.S. PATENT DOCUMENTS 11,588,593 B2 * 2/2023 Kim ..................... H04L 5/0048
2017/0276761 A1   9/2017 Park
(Continued)

FOREIGN PATENT DOCUMENTS

CN    107172632 A    9/2017
CN    107925537 A    4/2018
(Continued)

OTHER PUBLICATIONS

International Search Report and Written Opinion from corresponding International Application No. PCT/EP2020/080779, mailed Feb. 11, 2021, 17 pages.
(Continued)

*Primary Examiner* — Kabir A Timory
(74) *Attorney, Agent, or Firm* — Tucker Ellis LLP

(57) ABSTRACT

A method, performed by a network node, is disclosed for handling positioning of a User Equipment, wireless device. The network node obtains a first approximate position of the wireless device, based on a first positioning procedure for the wireless device in a first frequency allocation. The network node determines, based on the first approximate position of the wireless device, a set of resources to be used for a second positioning procedure in a second frequency allocation. The network node initiates the second positioning procedure in the second frequency allocation using the determined set of resources. The network node obtains an updated position of the wireless device based on the second positioning procedure.

20 Claims, 10 Drawing Sheets

(51) Int. Cl.
*H04L 5/00* (2006.01)
*H04W 72/0453* (2023.01)

(58) Field of Classification Search
CPC .......... G01S 5/011; G01S 5/0036; G01S 5/06; G01S 5/10; H04L 5/0048; H04L 5/0094; H04B 7/0695; H04B 7/088
See application file for complete search history.

(56) References Cited

U.S. PATENT DOCUMENTS

| | | | |
|---|---|---|---|
| 2017/0339658 A1* | 11/2017 | Wang | G01S 5/021 |
| 2018/0324738 A1 | 11/2018 | Stirling-Gallacher et al. | |
| 2021/0076359 A1* | 3/2021 | Sosnin | H04W 72/56 |

FOREIGN PATENT DOCUMENTS

| | | |
|---|---|---|
| CN | 108781098 A | 11/2018 |
| CN | 109588064 A | 4/2019 |
| CN | 110402548 A | 11/2019 |
| WO | 2018171860 A1 | 9/2018 |

OTHER PUBLICATIONS

Office Action and Search Report from corresponding Swedish Application No. 1951293-8, mailed Oct. 2, 2020, 10 pages.
Sony, "Discussion on different RAT dependent NR Positioning techniques," 3rd Generation Partnership Project (3GPP) TSG-RAN WG2 Meeting #108, Nov. 18-22, 2019, R2-1915238, 6 pages.
Nokia, et al., "Measurements for PRS on-demand," 3rd Generation Partnership Project (3GPP) TSG RAN WG1 #96bis, Apr. 8-12, 2019, R1-1905265, 3 pages.
Sony, "Considerations on Downlink based Positioning in NR," 3rd Generation Partnership Project (3GPP) TSG RAN WG1 #96, Feb. 25,-Mar. 1, 2019, R1-1902188, 8 pages.

* cited by examiner

METHODS FOR HANDLING POSITIONING OF A WIRELESS DEVICE AND RELATED NETWORK NODES AND WIRELESS DEVICE The present disclosure relates to methods for handling positioning of a wireless device, related network nodes and related wireless device.

BACKGROUND

The $3^{rd}$ Generation Partnership Project (3GPP) New Radio (NR) is designed to be deployed in spectrum at various carrier frequencies [3GPP Technical Specification (TS) 38.104 V 16.1.0]. The lower frequencies currently defined, which may be referred to as Frequency Range 1 (FR 1), start from around 600 MHz and range up to around 6 GHz. A channel situation and carrier frequency related issues involved in operating NR at these frequencies are similar to operating a 3GPP Long Term Evolution (LTE) system. The NR design and numerologies used for FR1 are therefore very much like operating a regular LTE network. However, NR is also designed to be operated in higher carrier frequencies. As of now, a second frequency range, referred to as FR2, is supported, and is around 28 GHz. Even higher frequencies of above 52 GHz are currently being discussed in 3GPP. In such frequencies, a narrow-beam transmission can be required to compensate for an increased pathloss due to the high carrier frequency. In contrast, FR1 is typically using omni directional transmissions or wide-beam transmissions.

NR is designed to support higher bandwidths than LTE, with component carriers of up to 20 MHz. By utilizing higher frequency bands this is more easily achieved. For example, the maximum supported bandwidth in FR1 and FR2 are, as of now, 100 MHz and 400 MHz, respectively.

Support for positioning of a User Equipment (UE) in NR is introduced in 3GPP rel.16. Both downlink (DL) based and uplink (UL) based positioning are supported. The UE may perform at least one measurement and may then report to a location server (LS) for positioning estimation. The location server (LS) may perform positioning estimation after a reception of multiple positioning measurement. In legacy LTE, the LS requires at least three positioning measurements from three base-stations for a multi-lateration based positioning estimation. Alternatively, the UE may perform both measurement and positioning estimation assuming the UE has collected required and/or sufficient information.

The initial target of NR positioning for both regulatory and commercial requirements are described in TR 38.855 V 16.0.0. In general, commercial requirements have very demanding requirements, such as accurate horizontal and/or vertical positioning accuracy, and low latency. It is quite challenging to fulfil commercial requirements in various use-cases and scenarios.

SUMMARY

Accordingly, there is a need for devices and methods for positioning of a User equipment (UE), which mitigate, alleviate or address the shortcomings existing and provide improved accuracy of the positioning.

A method is disclosed, performed by a network node, for handling positioning of a wireless device. The method comprises obtaining a first approximate position of the wireless device, based on a first positioning procedure for the wireless device in a first frequency allocation. The method comprises determining, based on the first approximate position of the wireless device, a set of resources to be used for positioning procedure in a second frequency allocation. The method comprises initiating a second positioning procedure in the second frequency allocation using the determined set of resources. The method further comprises obtaining an updated position of the wireless device based on the second positioning procedure.

Further, a method is disclosed, performed by a radio network node, for handling positioning of the wireless device. The method comprises performing a first positioning procedure of the wireless device in a first frequency allocation. The method comprises receiving, from a network node, a set of resources to be used for a second positioning measurement in a second frequency allocation, wherein the set of resources are associated with a result of the first positioning procedure. The method further comprises performing the second positioning procedure of the wireless device in the second frequency allocation using the set of resources received from the network node.

Further, a method is disclosed, performed by a wireless device, for handling positioning of the wireless device. The method comprises performing a first positioning procedure in a first frequency allocation. The method comprises receiving, from a network node, a set of resources to be used for a second positioning measurement in a second frequency allocation, wherein the set of resources are associated with a result of the first positioning procedure. The method further comprises performing a second positioning procedure in the second frequency allocation using the set of resources received from the network node.

Further, a network node is provided, the network node comprising a memory circuitry, a processor circuitry, and a wireless interface. The wireless device is configured to perform a method as disclosed herein.

Further, a radio network node is provided, the radio network node comprising a memory circuitry, a processor circuitry, and a wireless interface. The radio network node is configured to perform a method as disclosed herein.

Further, a wireless device is provided, the wireless device comprising a memory circuitry, a processor circuitry, and a wireless interface. The wireless device is configured to perform a method as disclosed herein.

It is an advantage of the present disclosure that an accuracy of the positioning procedure can be improved while reducing the time and resources required for performing the positioning procedure. The positioning accuracy is improved by combining a fast positioning procedure in the first frequency allocation with a slower more precise positioning procedure in the second frequency allocation. Furthermore, a signaling overhead of positioning resources may be reduced.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
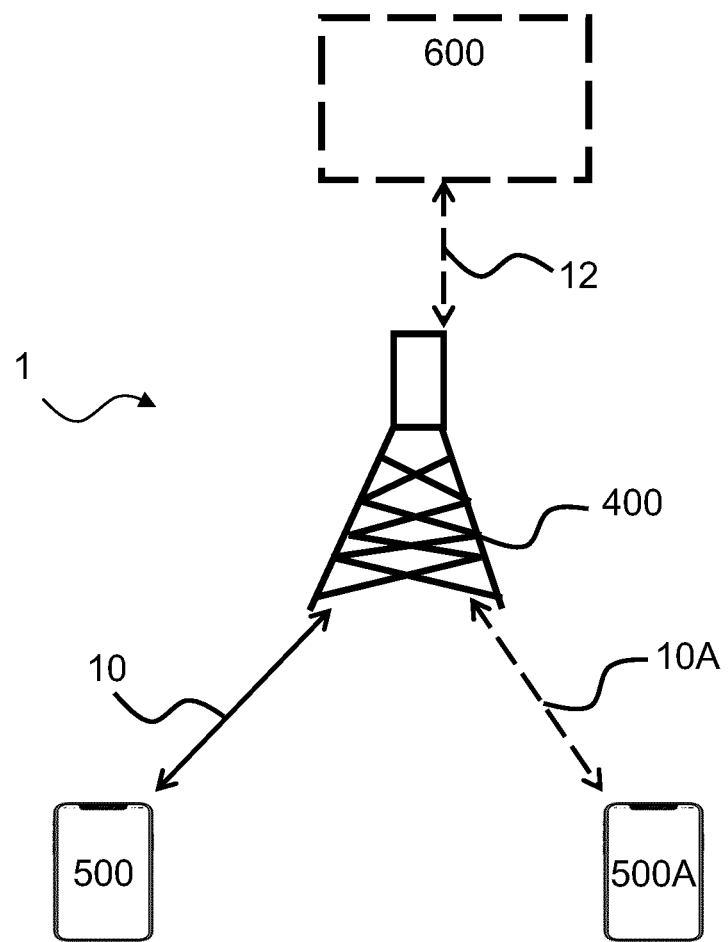
FIG. 1A is a diagram illustrating an exemplary wireless communication system comprising an exemplary network node, an exemplary radio network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

As discussed in detail herein, the present disclosure relates to a wireless communication system 1 comprising a cellular system, e.g. a 3GPP wireless communication system. The wireless communication system 1 comprises a wireless device 500 and/or a network node 400.

A network node disclosed herein refers to a radio access network node operating in the radio access network, such as a base station, an evolved Node B, eNBs, a global Node B, gNBs.

The wireless communication system 1 described herein may comprise one or more wireless devices 500, 500A, and/or one or more network nodes 400, such as one or more of: a base station, an evolve Node B (eNB), a next generation Node B (gNB) and/or an access point.

A wireless device may herein also be referred to as a mobile device and/or a user equipment, UE.

The wireless device 500, 500A may be configured to communication with the network node 400 via a wireless link (or radio access link) 10, 10A.

The present disclosure provides a method for handling positioning of a wireless device, such as a UE. Based on the positioning measurements obtained from a first frequency allocation it is possible to assist the positioning measurement in a second frequency allocation (e.g. in a higher frequency, such as in a mmWave spectrum) which may provide higher accuracy positioning. The frequency allocation may be a frequency range, such as e.g. a frequency range FR1 or FR2 as defined by 3GPP, or a frequency layer, which may be a subset of the frequency ranges defined by 3GPP. The frequency range of FR1 and FR2 are defined in TS 38.101-1 V16.1.0 and TS 38.101-2 V16.1.0, respectively. Other frequency range, such as FR3, may be defined in the future releases. The positioning measurement in higher frequencies may require a complex operation, such as a beam selection and beam sweeping operation. The embodiments herein provide a dual frequency positioning procedure (e.g. a lower frequency (such as FR1) and a higher frequency (such as FR2). In such a positioning procedure, a radio network node, such as a base-station, e.g. an eNB or a gNB, may allocate independent positioning resources in each frequency range which may result in high overhead. Another issue, in case a UE is operated in high frequency is that it may take some time to obtain a beam alignment as both a transmitter and a receiver perform beam sweeping during the positioning measurement. The embodiments herein address the above-mentioned issues and provide a high accuracy positioning procedure while reducing an overhead of positioning resources and reducing latency.

Beam management in NR for higher frequency allocations, such as for FR2 and beyond has been introduced by 3GPP. A first beam pair between a UE and a cell may be established during a phase of initial cell search procedure where the UE attempts to read and detect signal on synchronization signals transmitted by the cell in a Synchronization Signal Block (SSB). Several beams of the cell may sequentially transmit the SSB and the UE may attempt to acquire these signals and synchronize to the cell on the transmitted beams. The synchronization is followed by a random access procedure using the same beam setup and with this knowledge the network will know what beam pair that is the best to start a communication with for the UE. The spatial filters used for shaping the beams (analog or digitally) is assumed to be used as an initial assumption of the settings for a serving cell candidate. The initial beam pair and its spatial filter can be refined to give devices better signal properties with higher antenna gains at a later stage.

When a broadcast channel is read, which is also part of the SSB, system information may be read. This makes it possible to detect further signals from the cell and thereby refine the beam pairs by using other signals than the signals from the SSB. The measurements are typically based on a (Non Zero Power Channel State Information—Reference Signal (NZP-CSI-RS) that in many cases may use a narrower beam compared to the SSB based beams. A beam may be wide having its antenna gain spread in wide range giving a smaller gain over the covered area or may concentrate the gain in a smaller area giving a higher gain. The narrow beam has this higher gain and will thus provide a better signal and accuracy as long as the device is within the area covered by the spatial filter creating the beam. Typically, wider beams or no beams are used for lower frequency allocations, such as in FR1, as in LTE operations, for higher frequencies however, such as for FR2 and beyond, the beam handling may be based on one or more narrow beams.

Measurements of the downlink beam pair may be reported to the network, such as the radio network node to be used to select a downlink transmission beam. The report may comprise a channel state information in terms of a Channel Quality Indicator (CQI), Rank information (RI) and/or a Precoder-matrix indicator (PMI). It may also use a non-filtered version of a Reference Signal Received Power (RSRP) reported per beam pair. However, the downlink receiver beam measurements are currently not reported to the network for positioning purposes. For each of the base station side beams, the UE have to sweep its UE beams to see what UE beam that is the best. This UE side beam measurements of all the UE beams will not be reported to a base station such as a radio network node. Only the best that builds up the best beam pair.

Since the base station sequentially can sweep beams and the UE also sequentially sweep beams a lot of time will be consumed from other things in the system and will thereby cost power consumption of managing the beams. The periodicity or the time occasion of doing those measurements might vary with the amount of mobility to support, but in many cases the tracking of beams will be a quite frequent thing happening in a system both in Radio Resource Control (RRC) idle mode and in RRC connected mode.

The present disclosure provides a method for handling positioning of a wireless device, utilizing some of the beam handling principles discussed above. The positioning of the wireless device requires positioning measurements which may be based on the aforementioned reference signals (SSB, CSI-RS, SRS etc) or a new positioning signals (e.g. Positioning Reference Signal (PRS)). Based on positioning measurements obtained from a first frequency allocation, such as a frequency layer and/or a frequency range, such as e.g. frequency range FR1 as defined by 3GPP, the embodiments herein can assist a positioning measurement in a second frequency allocation, such as in another frequency layer and/or frequency range (e.g. in a higher frequency, such as in a mmWave spectrum) which may provide higher accuracy positioning.

The positioning measurement in higher frequencies typically requires a complex operation, such as beam selection and beam sweeping operation which is typically time and resource consuming. The embodiments herein however, provide a dual frequency positioning procedure (e.g. lower frequency (FR1) and higher frequency (e.g. frequency range FR2 and/or FR3 as defined by 3GPP). In such a positioning procedure, a radio network node, such as a base-station, e.g. an eNB or a gNB, typically allocates independent positioning resources in each frequency range which may result in high overhead. Another issue, in case a UE is operated in high frequency is that it may take some time to obtain a beam alignment as both a transmitter and a receiver perform beam sweeping during the positioning measurement. Hence, the latency for positioning estimation is high.

The embodiments disclosed herein, address the above-mentioned issues and provide a high accuracy positioning procedure while reducing an overhead of positioning resources and reducing latency.

The figures are schematic and simplified for clarity, and they merely show details which aid understanding the disclosure, while other details have been left out. Throughout, the same reference numerals are used for identical or corresponding parts.

FIG. 1A is a diagram illustrating an exemplary wireless communication system 1 comprising an exemplary network node 400 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device 500 and/or a radio network node 400.

A radio network node disclosed herein refers to a radio access network node operating in the radio access network, such as a base station, an evolved Node B, eNB, gNB.

The wireless communication system 1 described herein may comprise one or more wireless devices 500, 500A, and/or one or more radio network nodes 400, such as one or more of: a base station, an eNB, a gNB and/or an access point.

A wireless device may refer to a mobile device and/or a user equipment, UE.

The wireless device 500, 500A may be configured to communicate with the radio network node 400 via a wireless link (or radio access link) 10, 10A.

The wireless communication system 1 may further comprise a network node, such as a core network node 600, e.g. a Location Server (LS) comprised in a core network.

The embodiments disclosed herein provide an association of reference signal for positioning purpose, such as Positioning Reference Signal (PRS) configuration among PRS transmission in different frequency allocations, such as frequency layers and/or frequency ranges. The association may be among PRS resources and/or PRS resource sets. The PRS resources and/or the PRS resource sets may be indicated as resources transmitted periodically or aperiodically. The periodic PRS may be a PRS that is periodically transmitted from a base station to multiple wireless devices in a cell (cell-specific). The aperiodic PRS may be a PRS that is aperiodically transmitted from a base station to a wireless device or some wireless devices (UE-specific). The radio network node, such as the base-station, may inform the network node, such as the LS, and/or the wireless devices about the above association and configuration. This may be done by sending a resource configuration, which may comprise the PRS resources and/or PRS resource sets. The LS may also inform the wireless device about the resource configuration in case the radio network node cannot inform the wireless device directly.

The embodiments herein further provide a method to support multi-level positioning measurements in order to achieve high accuracy positioning while reducing an overhead of positioning resources and reducing latency.

Figure 1B:
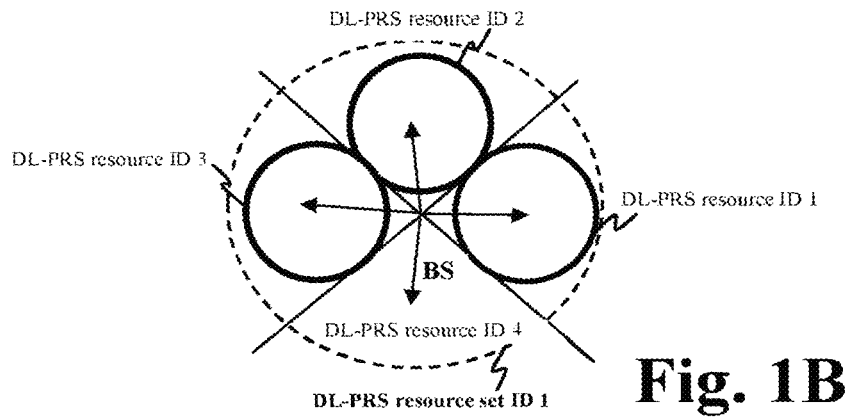
FIG. 1B is a diagram illustrating a first exemplary resource configuration of a radio network node.

An example of potential reference signal transmissions, such as PRS transmissions, which may also be referred to as resource configurations, from a radio network node is illustrated in FIG. 1B. Herein, a resource is a time, frequency and/or code resource for carrying reference signals. In FIG. 1B, a resource set is covering four directions of a radio network node, such as a base station, with four resources. Hence, resource set ID 1 in FIG. 1B comprises four resource IDs, namely Resource ID 1-4. Each resource comprises a set of resource elements, in a time/frequency range, in which reference signals are transmitted from each transmission point, such as a cell or a transmit beam of the base station. The resource configuration shown in FIG. 1B is typically used in FR1, where the transmissions cover a wider area, such as a cell.

Figure 1C:
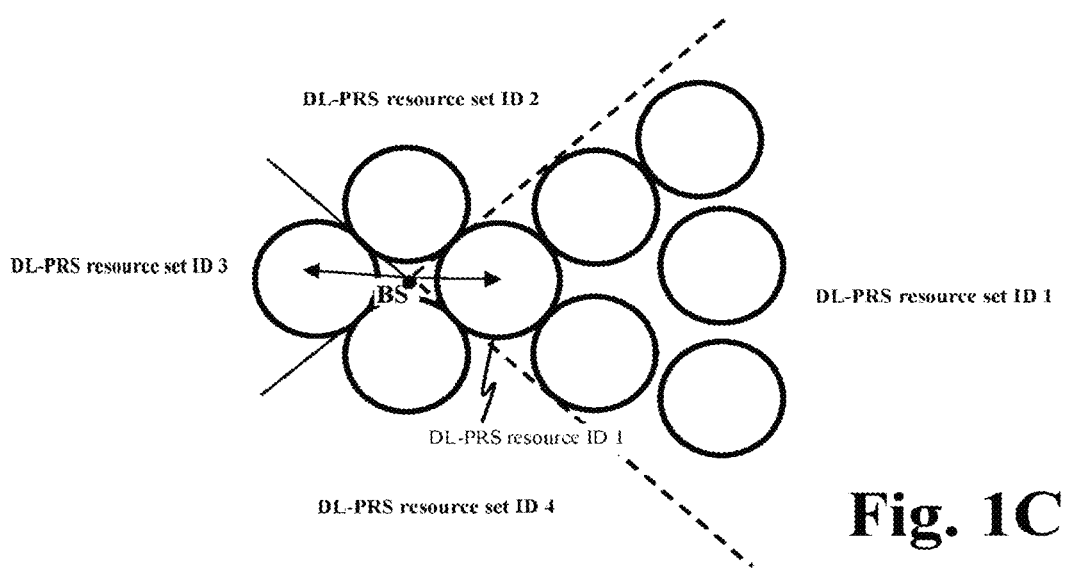
FIG. 1C is a diagram illustrating a second exemplary resource configuration of a radio network node.

In FIG. 1C, the base station covers four directions with four different resource sets, namely resource sets 1-4. Each resource set comprises multiple resources to cover certain areas, such as their respective direction.

Figure 1D:
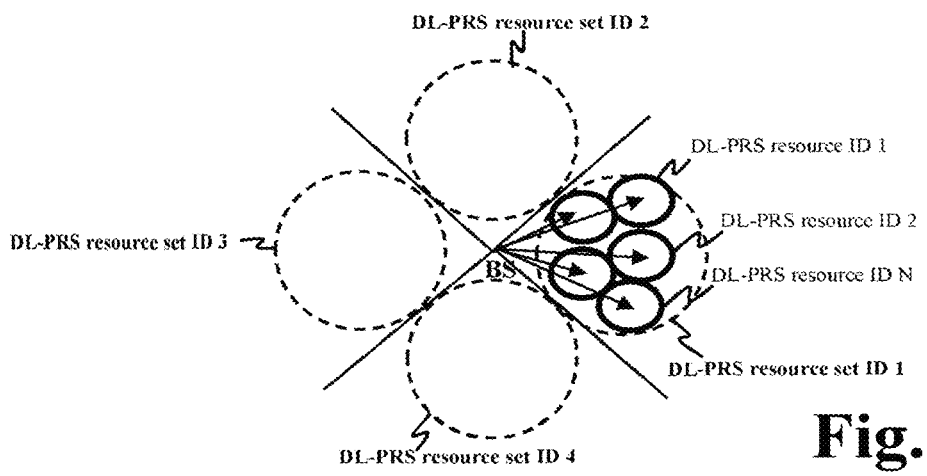
FIG. 1D is a diagram illustrating a third exemplary resource configuration of a radio network node.

In FIG. 1D, the base station has multiple resource sets to cover the same area as one resource set covers in FIG. 1C. Furthermore, a resource in FIG. 1B may be equivalent to a resource set in FIG. 1D. The resource configuration shown in FIG. 1D is typically used in FR2, where the transmissions are directional, which may also be referred to as transmitted as beams. Hence, a plurality of beams, indicated by a set of resource IDs or beam IDs, may be comprised in a resource set, indicated by a resource set ID. The plurality of beams in a resource set of FIG. 1D covers the same area as e.g. a cell, indicated by a resource ID in FIG. 1B. Each resource and resource set have an identity (e.g. number). Hence, by knowing the resource/resource set ID of the positioning resource(s) used for the measurement in one frequency allocation, an area or a beam direction between the base-station and the wireless device can be identified and/or derived. By having an association between the resources and/or resource set in the different frequency allocations, a corresponding set of resources and/or resource set may be determined which covers the same area or beam direction in a second frequency allocation which may be derived based on the first positioning procedure in the first frequency allocation.

Figure 1E:
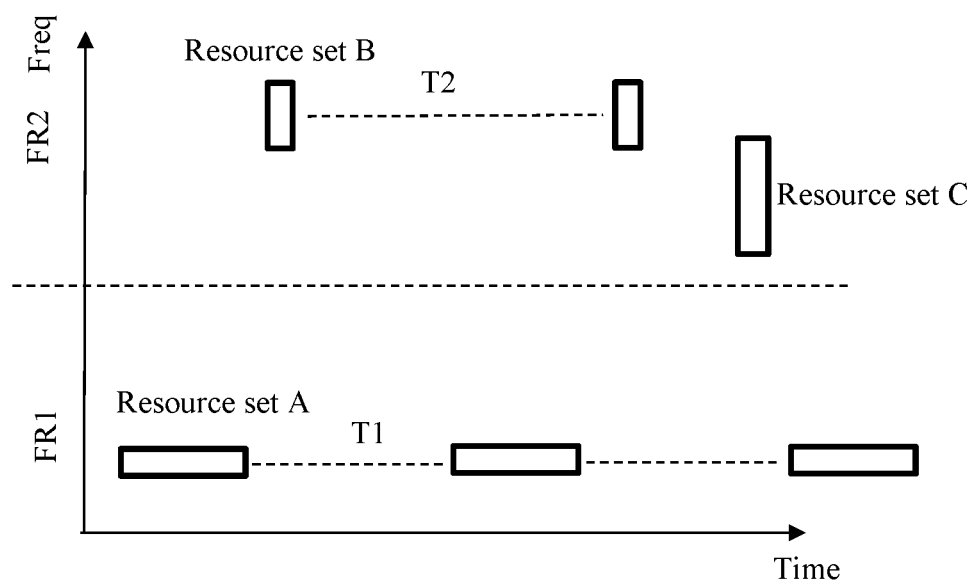
FIG. 1E is a diagram illustrating an exemplary resource configuration for different frequency allocations.

An exemplary resource allocation of PRS transmission is further shown in FIG. 1E, where a number of resource sets are allocated in various frequency locations (intra/inter frequency range). Resource set A and resource set B are periodically transmitted, where resource set A is transmitted with a periodicity of T1 and resource set B is transmitted with a periodicity of T2, while resource set C is aperiodically transmitted, e.g. by being event-triggered.

The network node, such as the location server, may obtain the resource configurations, such as the resource set configurations, of the radio network nodes. The location server may select and/or trigger the positioning measurements. The embodiments herein consider different positioning methods for different frequency spectrums and also a required accuracy and/or latency for the positioning.

Figure 2:
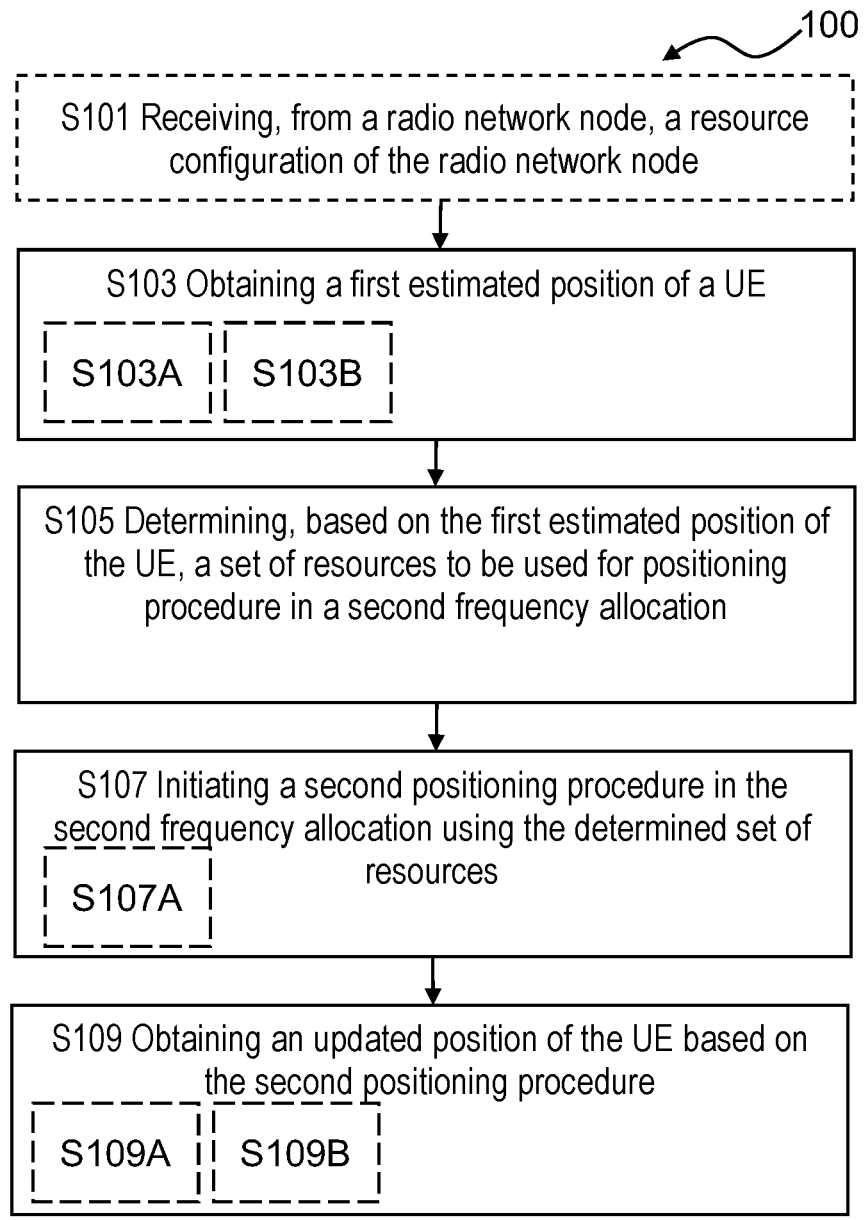
FIG. 2 is a flow-chart illustrating an exemplary method, performed in a network node of a wireless communication system, for handling positioning of a wireless device according to this disclosure.
Figure 5:
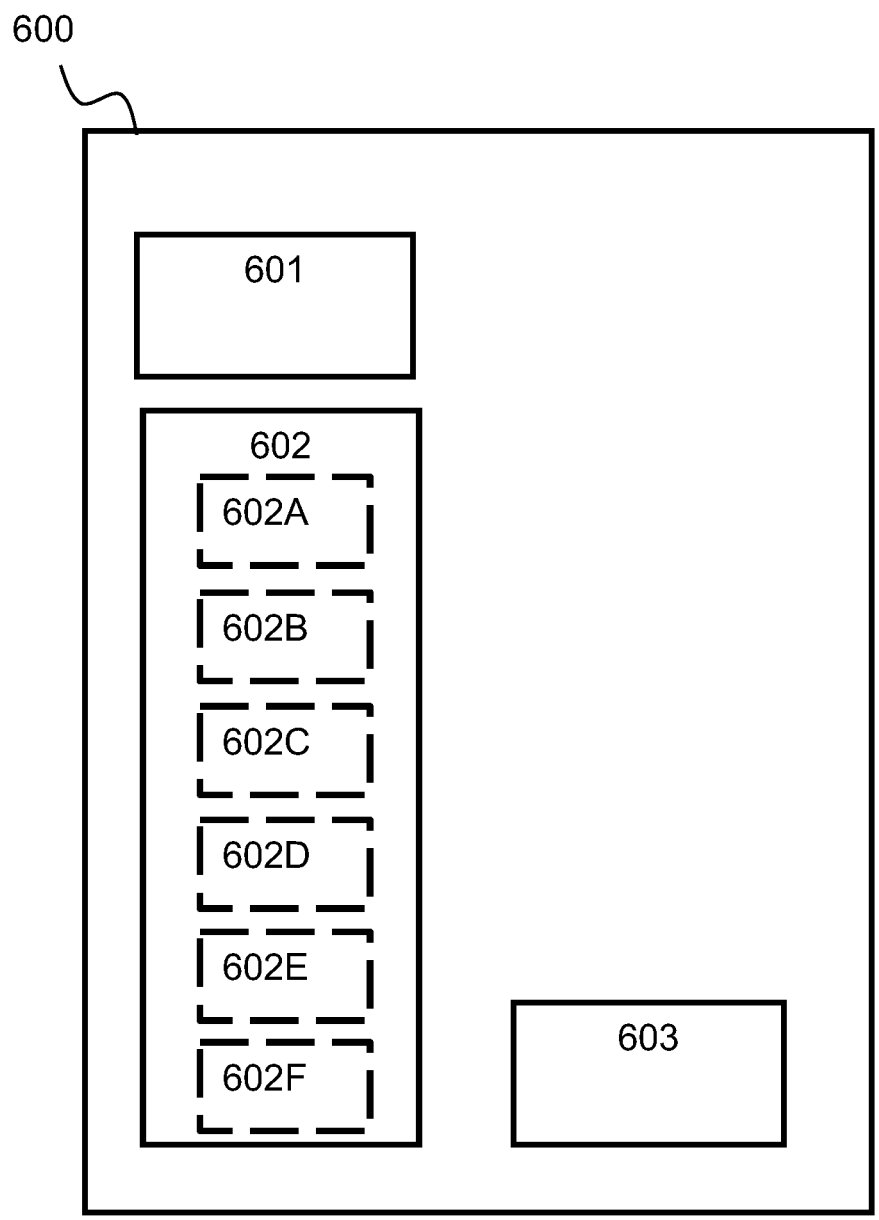
FIG. 5 is a block diagram illustrating an exemplary network node according to this disclosure.

FIG. 2 shows a flow diagram of an exemplary method of operating a network node (such as a network node disclosed herein, such as network node 600 of FIG. 1A, the network node of FIG. 2 and the network node 600 of FIG. 5), for handling positioning of the wireless device, according to the disclosure. The network node may be a network node handling positioning of the wireless device. The network node may also be referred to as a location server (LS). The method 100 comprises obtaining S103 a first approximate position of the wireless device, based on a first positioning procedure for the wireless device in a first frequency allocation. The positioning procedures mentioned herein, such as the first and/or the second positioning procedure may comprise positioning measurements, such as timing measurements, e.g. Reference Signal Time Difference (RSTD), power measurements, e.g. Reference Signal Received Power (RSRP) and/or positioning estimation of the actual coordinate of the wireless device. The approximate position may be a geographical position or may be indicated based on the resources, such as based on the resource ID, used for performing the first positioning procedure. In other words, the network node may receive measurement results indicating e.g. a highest RSRP and a corresponding resource ID information. The highest RSRP and the corresponding resource ID information implicitly indicates a position of the wireless device in relation to a radio network node corresponding to the resource ID. Based on the received resource ID information, the network node may determine, based e.g. on a received resource configuration of the radio network node, a set of resources corresponding to the received resource ID which can be used for the second positioning procedure. Hence, the approximate position based on the first positioning procedure may be an explicit geographical position, estimated based on measurement results, or an implicit position in relation to one or more radio network nodes indicated by the measurement result.

The obtaining S103 of the first approximate position of the wireless device may comprise receiving S103A, from a measuring device, measurement results indicative of the first positioning procedure for the wireless device in the first frequency allocation, and estimating S103B, based on the received measurement results (e.g. RSTD, RSRP, and/or resource ID), the first position of the wireless device. The measuring device may be any device participating in the positioning procedure, such as a radio network node or the wireless device, and performing measurements for positioning the wireless device. The measurements may e.g. be performed on reference signals transmitted by a device configured to transmit reference signals during the positioning procedure. If the positioning procedure is performed in an uplink (UL) the measuring device from which the measurement results are obtained may be the radio network node, and the device transmitting the reference signals may be the wireless device. If the positioning procedure is performed in a downlink (DL) the measuring device from which the measurement results are obtained may be the wireless device, and the device transmitting the reference signals may be the radio network node. The obtaining of the first approximate position of the wireless device may be initiated by the network node. The method 100 may thus further comprise initiating the first positioning procedure in the first frequency allocation using a determined set of resources. The initiating of the first positioning measurement in the first frequency allocation may comprise sending, to the measuring device, such as the radio network node and/or the wireless device, an indication of a set of resources to be used for positioning procedures in the first frequency allocation. The set of resources may be sent to the radio network node over a New Radio Positioning Protocol A (NRPPa).

The method 100 comprises determining S105, based on the first approximate position of the wireless device, a set of resources to be used for a second positioning procedure in a second frequency allocation. The second frequency allocation may be different than the first frequency allocation. In some embodiments herein, the second frequency allocation may be higher, such as comprise higher frequencies, such as carrier frequencies, and/or a wider bandwidth, than the first frequency allocation. Due to an increased granularity at higher frequencies, due to the narrower beams used for these frequencies, a finer positioning of the wireless device may be achieved.

Based on the first positioning estimation using the first frequency allocation, such as a frequency layer or a frequency range (e.g. FR1), the network node may trigger selected radio network nodes, such as gNBs, and/or corresponding beams, indicated by a resource and/or resource set, performing the second positioning procedure in the second frequency allocation (e.g. frequency range FR2 or FR3). Furthermore, the radio network nodes and transmission points (TPs) that will be involved in the second positioning procedure may be limited based on the location obtained for the wireless device in the first positioning procedure at the first frequency allocation. The beams for each of the involved radio network nodes, such as gNBs, may be chosen as a subset of all beams available to the radio network node based on the information gathered from the first positioning measurement. Hence, the set of resources to be used for a second positioning procedure in a second frequency allocation are associated with the result of the first positioning procedure.

The second positioning procedure may be initiated within a preconfigured time gap from the first positioning procedure. The gap after the end of the first PRS transmission to the start of the second PRS transmission may be in the order of N times slot duration in NR. The slot duration in NR for 15 kHz sub-carrier spacing is 1 ms. The time gap may be in the range of 1 to 100 ms. By reducing the time gap between the two positioning procedures the latency and also the signalling may be reduced (minimize the number of bits as the radio network node does not have to provide the gap value every time).

The method 100 comprises initiating S107 a second positioning procedure in the second frequency allocation using the determined set of resources. The initiating S107 the positioning measurement in the second frequency allocation using the determined set of resources may comprise sending S107A, to a device configured to transmit reference signals during the positioning procedure, such as the radio network node during DL positioning and/or the wireless device during UL positioning, an indication of the set of resources to be used for positioning procedures in the second frequency allocation. The set of resources may be sent to the radio network node over the NRPPa, and to the wireless device via a Long Term Evolution Positioning Protocol (LPP). In one or more example methods, the initiating S107 and/or the sending S107A may comprise sending the indication of the set of resources to be used for positioning procedures in the second frequency allocation to the measuring device, such as the radio network node during UL positioning and/or the wireless device during DL positioning.

The resources may be indicated using a resource ID, which may indicate a beam ID of a transmit beam for transmitting reference signals, such as PRSs, during the positioning procedure. The set of resources may comprise resources indicating one or more network nodes and/or transmit beams for transmitting reference signals for the positioning of each wireless device. The resource set may also be indicated using a resource set ID. The set of resources may thus be indicated by one or more resource IDs, wherein each of the one or more resource IDs may be indicative of one beam or one cell of a radio network node, such as a base station. For example, the resource arrangement in the first frequency allocation, such as in FR1, may be as shown in FIG. 1B (a) and an approximate position of the wireless device may firstly be measured and/or determined based on the PRS resource ID #1. A high accuracy positioning in the second frequency allocation, such as in FR2, may be done by allocating the PRS resource set ID 1 of FIG. 1B (c). Since the PRS resource set ID 1 covers the same area as the PRS resource ID #1 they are associated with each other, and the PRS resource set ID 1 will likely be suitable for performing a refined positioning measurement of the wireless device in its current position. The network node may allocate all PRS resources or a subset of the available resources. Resources in the second frequency allocation covering the approximate position of the wireless device during the first positioning procedure may be selected for performing the second positioning procedure for the wireless device. In other words, the network node may send the determined corresponding resources for the second frequency allocation based on the initial results obtained from the first positioning procedure in the first frequency allocation. Thereby, the radio network node, such as the gNB, does not have to perform beam-sweeping with multiple resource set IDs of FIG. 1B (c). Instead only beams covering the approximate position of the wireless device may be swept. Thereby, a resource overhead and latency of the positioning procedure can be reduced.

In order to assist the wireless device and the radio network nodes to perform the positioning of the wireless device, assistance data may be extracted from the first positioning measurement. The assistance data may be seen as an association of the resource sets used for the first and the second positioning procedures and tells the wireless device which resources it may use to measure during the second positioning procedure. For example, if the network node tells the wireless device that the second positioning procedure will use resource set ID 1 as in FIG. 1D then it may provide an indication that the wireless device should use a similar receive beam as when the wireless device received resource ID 1 as in FIG. 1B during the first positioning procedure. Furthermore, if the network node tells the wireless device that the second positioning procedure will use resource set ID 1 as in FIG. 1D plus Quasi Co Location (QCL) info with the same Doppler shift, average delay, doppler spread, and/or delay spread then it gives indication that the wireless device should use the same or partially the same channel profile assumption as when the wireless device received resource ID 1 as in FIG. 1B during the first positioning procedure. The measurements in the first frequency allocation may indicate a time delay and a delay spread of the measured signal that may be used for the second measurement in the second frequency allocation to increase detection performance and speed of the positioning procedure for the wireless device. The assistance data may e.g. be an RSTD window location in time and size in case of RSTD measurements. This assistance data may then be provided to the measuring devices, such as the wireless device and/or the radio network nodes. In one or more example methods, the measuring device is a wireless device during DL positioning. In one or more example methods, the measuring device is a radio network node during UL positioning. In addition, a QCL relation between different frequency layer may be comprised in the assistance data. Transmissions in the first frequency allocation may have a QCL relation with transmissions in the second frequency allocation from same transmission points.

The assistance data may assist the measuring devices in the selection of spatial filters and transmission settings for performing the positioning procedure. The wireless device may be assisted with information about what allocation, resources, resource ID, QCL relations and estimation support in terms of narrowed down correlation window size and placement. Hence, by knowing such information (i.e. narrowed down correlation window size and placement), the wireless device can improve the positioning measurements. The network node has collected the resource configuration and its association (i.e. the association among different frequency layer/range).

The method comprises obtaining S109 an updated position of the wireless device based on the second positioning procedure. The obtaining S109 the updated position may comprise receiving S109A, from a measuring device, measurement results indicative of the second positioning procedure in the second frequency allocation, and determining S109B an updated position of the wireless device based on the measurement results from the second positioning procedure. The measurement results may be received from the radio network node and/or from the wireless device depending of the method of positioning. The measurement results may be tagged with an ID indicative of the positioning estimations corresponding to the positioning measurements in the first frequency allocation.

The updated position, which may be more precise, which may also be referred to as refined, than the approximate position determined in the first positioning procedure, may be determined by combining the measurement results indicative of the first and the second positioning measurements. If the second measurement results are more accurate than the first measurement results, the network node may replace the position obtained by the first positioning measurements with the position obtained by the second positioning measurement instead of combining the two measurements.

In some embodiments herein, the method may further comprise receiving S101, from the device configured to transmit reference signals during the positioning procedure, a resource configuration of the device configured to transmit reference signals during the positioning procedure. The resource configuration of the device may comprise a first set of resources for the first positioning procedure in the first frequency allocation, and a second set of resources for the second positioning procedure in the second frequency allocation. Each set of resources may comprise one or more resources, hence one resource set ID may comprise one or more resource IDs depending on the size of each individual resource.

The resource configuration may further comprise an association of the first set of resources on the first frequency allocation and the second set of resources on the second frequency allocation. The radio network node may e.g. map its resource sets for the different frequency allocations to each other in a resource configuration, based on e.g. a direction or an area that the resources and/or resource sets cover. The resource configuration may then be provided to the network node in order to provide an association of the resources and/or resource sets which may be used for determining a corresponding resource set for the second positioning procedure in the second frequency allocation based on the first positioning procedure in the first frequency allocation.

The resource configuration may comprise a reference signal configuration of the device for different frequency allocations, and an association of the reference signal configurations for the different frequency allocations. The reference signal may be a PRS. The PRS configurations may be associated based on a geographical area covered by the PRS configurations. The association of the resource configurations may therefore be indicative of an area which the cells and/or beams cover. The device configured to transmit reference signals during the positioning procedure may be the wireless device or the radio network node depending on the positioning method used.

The positioning procedure may be DL-based, in which the radio network node transmits reference signals and the wireless device performs measurements on the transmitted reference signals. The DL-based positioning procedure may be based on RSRP measurement and/or RSTD measurement. The RSRP/RSTD measurements may be carried out based on the reception of downlink reference signals, such as downlink positioning reference signals (DL-PRS). The positioning reference signals (PRS) resources may be represented with a resource ID. The resource ID in this context may represent a beam and/or a beam direction, and may therefore also be referred to as a beam ID. A set of PRS resources with the same configuration may be represented with a set ID. A radio network node, such as a base station, may be configured with multiple resource sets. The PRS resource comprises multiple resource elements in time and/or frequency to be used for a positioning measurement (e.g. for RSTD, RSRP). A set of PRS resources with the same configuration may be characterized by having the same numerology and number of OFDM symbols and PRS pattern.

The positioning procedure may also be UL-based, in which the wireless device transmits reference signals and the radio network node performs measurements on the transmitted reference signals. The UL-based positioning procedure may e.g. use Sounding Reference Signals (SRS) as reference signals, or wireless device based positioning where the wireless device calculates its positioning estimate (e.g. coordinates) based on measurements of the reference signals, or Cell Identity (CID) based positioning techniques. Typically, wireless device based positioning can be enabled as long as the wireless device is provided with the coordinates of surrounding base-stations.

Figure 3:
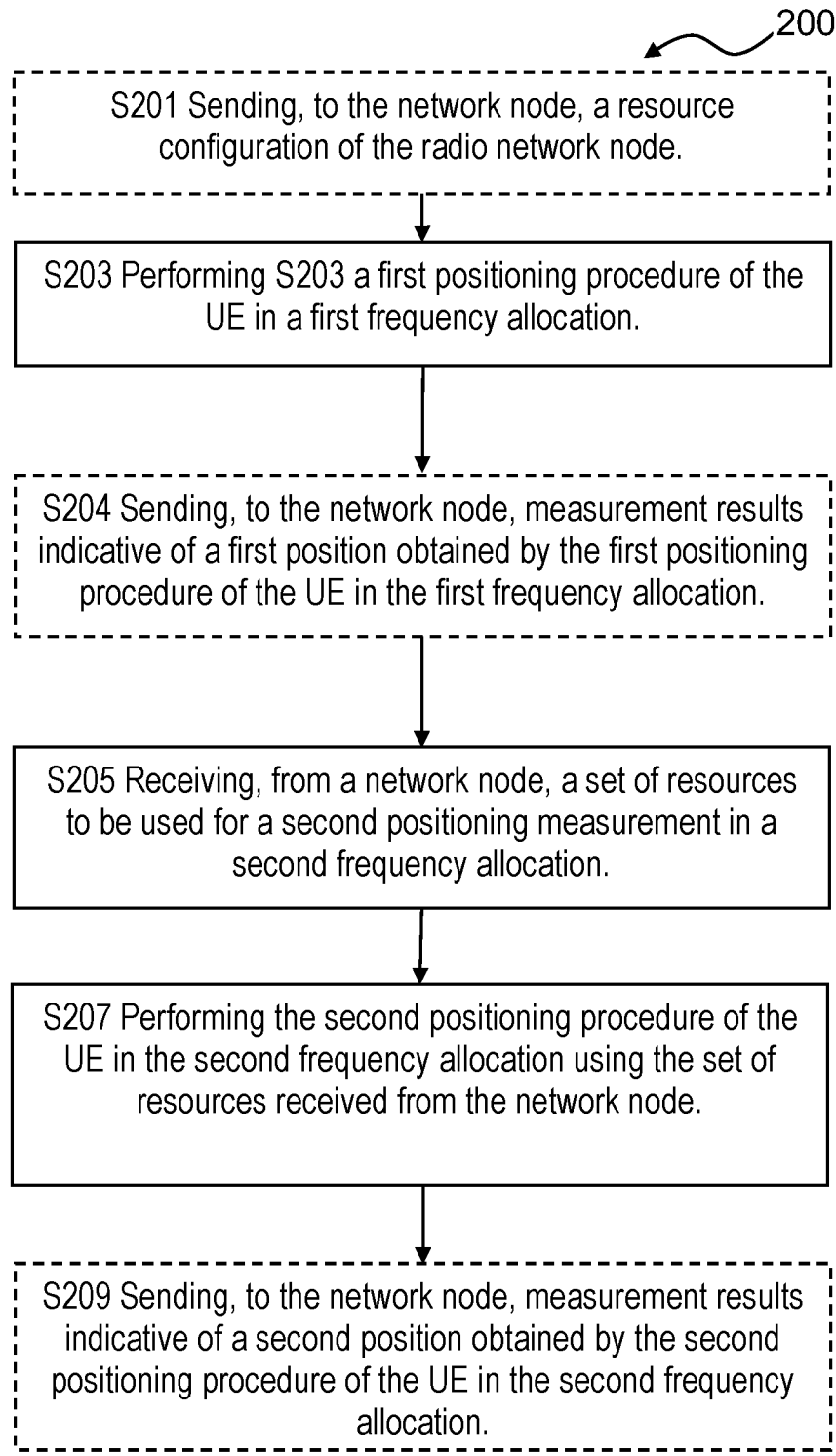
FIG. 3 is a flow-chart illustrating an exemplary method, performed in a radio network node of a wireless communication system, for handling positioning of a wireless device according to this disclosure.
Figure 6:
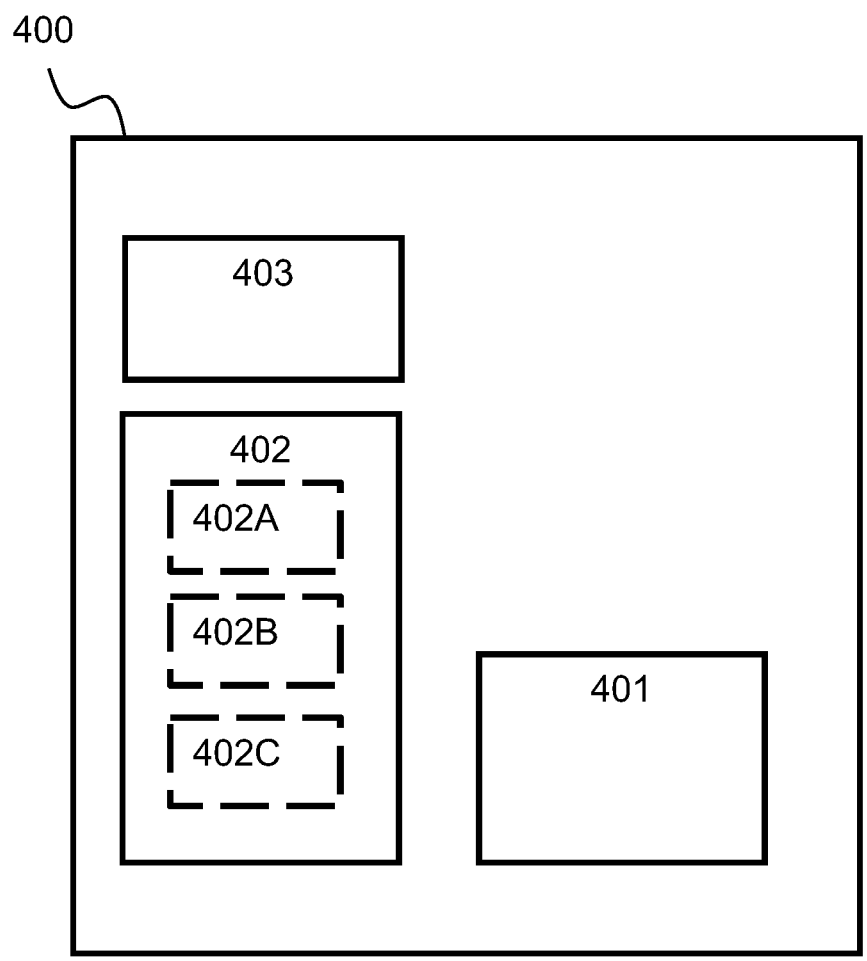
FIG. 6 is a block diagram illustrating an exemplary radio network node according to this disclosure.

FIG. 3 shows a flow diagram of an exemplary method of operating a Radio network node (such as a Radio network node disclosed herein, such as Radio network node 400 of FIG. 1A, the Radio network node of FIG. 3 and the Radio network node 400 of FIG. 6), for handling positioning of the wireless device according to the disclosure. The method 200 comprises performing S203 a first positioning procedure of the wireless device in a first frequency allocation.

The method 200 comprises receiving S205, from a network node, a set of resources to be used for a second positioning measurement in a second frequency allocation, wherein the set of resources are associated with a result of the first positioning procedure. The resource configuration may comprise a PRS configuration to be used for the positioning procedure for the wireless device. The set of resources may be received over a NRPPa. The second frequency allocation may be different than the first frequency allocation. In some examples the second frequency allocation may be higher than the first frequency allocation. The set of resources may be associated with one or more Radio network nodes, and/or with one or more beams of the radio network node.

The method 200 comprises performing S207 the second positioning procedure of the wireless device in the second frequency allocation using the set of resources received from the network node.

The method 200 may further comprise sending S204, to the network node, measurement results indicative of the first positioning procedure of the wireless device in the first frequency allocation.

The method 200 may further comprise sending S209 measurement results indicative of the second position of the wireless device obtained by the second positioning procedure in the second frequency allocation.

The method 200 may comprise sending S201, to the network node, a resource configuration of the Radio network node. The resource configuration of the Radio network node may comprise a PRS configuration of the Radio network node for different frequency allocations, and an association of the PRS configurations for the different frequency allocations. The PRS configurations may be associated based on a geographical area covered by the PRS configurations. The association may be indicative of an area which the cells and/or transmit beams cover. If the PRS configurations cover overlapping geographical areas, they may be associated.

Figure 4:
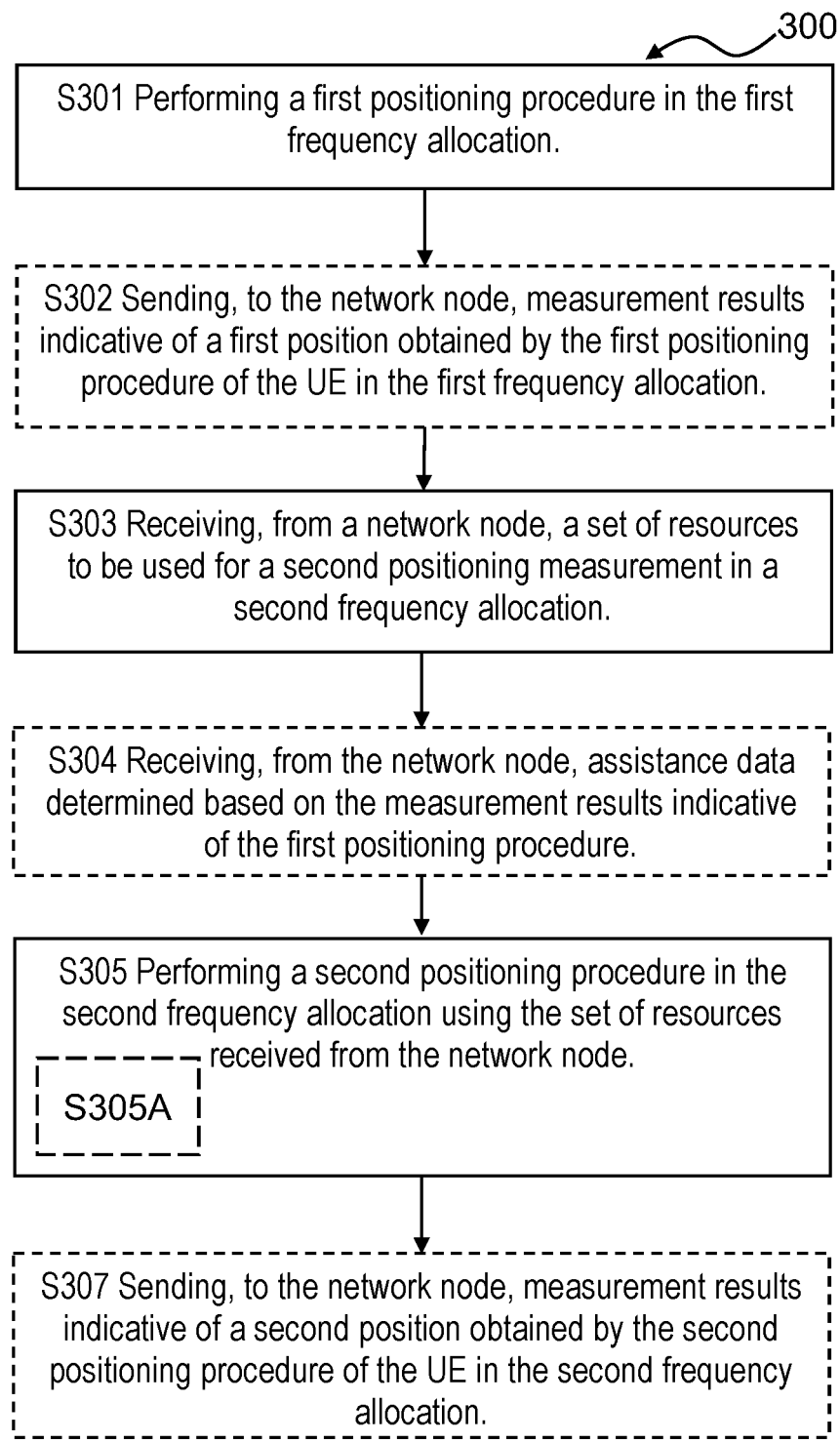
FIG. 4 is a flow-chart illustrating an exemplary method, performed in a wireless device of a wireless communication system, for handling positioning of the wireless device according to this disclosure.
Figure 7:
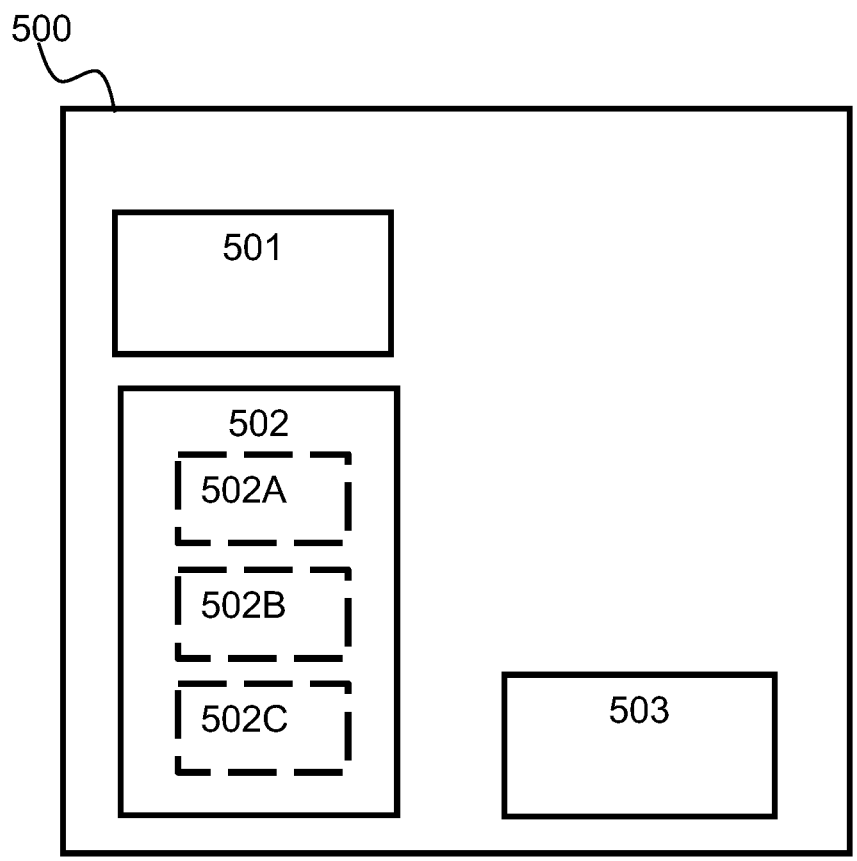
FIG. 7 is a block diagram illustrating an exemplary wireless device according to this disclosure.

FIG. 4 shows a flow diagram of an exemplary method of operating a wireless device (such as a wireless device disclosed herein, such as wireless device 500 of FIG. 1A, the wireless device of FIG. 4 and the wireless device 500 of FIG. 7), for handling positioning of the wireless device according to the disclosure. The method 300 comprises performing S301 a first positioning procedure in the first frequency allocation, in order to position the wireless device.

The method 300 may further comprise sending S302, to the network node, measurement results indicative of a first position obtained by the first positioning procedure of the wireless device in the first frequency allocation.

The method 300 comprises receiving S303, from a network node, a set of resources to be used for a second positioning measurement in a second frequency allocation, wherein the set of resources are associated with a result of the first positioning procedure. The second frequency allocation may be different than the first frequency allocation. The set of resources may be associated with one or more Radio network nodes, and/or one or more transmit beams of the radio network node.

The method 300 may further comprise receiving S304, from the network node, assistance data determined based on the measurement results indicative of the first positioning procedure.

The method 300 comprises performing S305 a second positioning procedure in the second frequency allocation using the set of resources received from the network node. The second frequency allocation may comprise higher frequencies, such as carrier frequencies, and/or a wider bandwidth than the first frequency allocation.

The performing S305 of the second positioning procedure may comprise performing S305A the second positioning procedure in the second frequency allocation further based on assistance data received from the network node.

The method 300 may further comprise sending S307 measurement results indicative of the second position of the wireless device obtained by the second positioning procedure in the second frequency allocation.

Some wireless devices may have limitations in terms of frequency allocations, such as frequency layers and/or frequency ranges the are configured to operate on. The wireless device may therefore, in some embodiments, signal its frequency capability to the serving radio network node and/or the network node, such as the location server. Hence, the method 300 may further comprise signaling the frequency capability to the serving radio network node and/or the network node FIG. 5 shows a block diagram of an exemplary network node 600 according to the disclosure. The network node 600 comprises a memory circuitry 601, a processor circuitry 602, and a wireless interface 603. The network node 600 may be configured to perform any of the methods disclosed in FIG. 2.

The network node 600 is configured to communicate with a radio network node, such as the radio network node disclosed herein, using a communication system. The interface 603 is configured for communications via the communication system, such as a communication system supporting positioning of the wireless device.

The network node 600 is configured to obtain (e.g. via the interface 603 or via an obtaining circuitry 602A) a first approximate position of the wireless device, based on a first positioning procedure for the wireless device in a first frequency allocation.

The network node 600 is configured to determine (e.g. via the processor circuitry 602 or via a determining circuitry 602B), based on the first approximate position of the wireless device, a set of resources to be used for a second positioning procedure in a second frequency allocation.

The network node 600 is configured to initiate (e.g. via the processor circuitry 602 or via an initiating circuitry 602C) the second positioning procedure in the second frequency allocation using the determined set of resources.

The network node 600 is configured to obtain (e.g. via the interface 603 or via the obtaining circuitry 602A) an updated position of the wireless device based on the second positioning procedure.

The network node 600 may be configured to receive (e.g. via the interface 603 or via a receiving circuitry 602D), from a measuring device, measurement results indicative of the first positioning procedure for the wireless device in the first frequency allocation.

The network node 600 may be configured to estimate (e.g. via the processor circuitry 602 or via an estimating circuitry 602D), based on the received measurement results, the first position of the wireless device.

The network node 600 may be configured to receive (e.g. via the processor circuitry 602 or via a receiving circuitry 602E), from a measuring device, measurement results indicative of the second positioning procedure in the second frequency allocation.

The network node 600 may be configured to determine (e.g. via the processor circuitry 602 or via the determining circuitry 602B) an updated position of the wireless device based on the measurement results from the second positioning procedure.

The network node 600 may be configured to receive (e.g. via the interface 603 or via the receiving circuitry 602E), from a Radio network node, a resource configuration of the Radio network node. The resource configuration may comprise the set of resources.

The network node 600 may be configured to send (e.g. via the interface 603 or via a sending circuitry 602F), to the measuring device, an indication of the set of resources to be used for positioning procedures in the second frequency allocation.

The processor circuitry 602 is optionally configured to perform any of the operations disclosed in FIG. 2. The operations of the network node 600 may be embodied in the form of executable logic routines, e.g., lines of code, software programs, etc., that are stored on a non-transitory computer readable medium, e.g., the memory circuitry 601, and are executed by the processor circuitry 602.

Furthermore, the operations of the network node 600 may be considered a method that the network node 600 is configured to carry out. Also, while the described functions and operations may be implemented in software, such functionality may as well be carried out via dedicated hardware or firmware, or some combination of hardware, firmware and/or software.

The memory circuitry 601 may be one or more of a buffer, a flash memory, a hard drive, a removable media, a volatile memory, a non-volatile memory, a random access memory (RAM), or other suitable device. In a typical arrangement, the memory circuitry 601 may include a non-volatile memory for long term data storage and a volatile memory that functions as system memory for the processor circuitry 603. The memory circuitry 601 may exchange data with the processor circuitry 602 over a data bus. Control lines and an address bus between the memory circuitry 601 and the processor circuitry 602 also may be present (not shown in FIG. 5). The memory circuitry 601 is considered a non-transitory computer readable medium.

The memory circuitry 601 may be configured to store positioning measurements and information indicative thereof in a part of the memory based on the received software data.

FIG. 6 shows a block diagram of an exemplary Radio network node 400 according to the disclosure. The Radio network node 400 comprises a memory circuitry 401, a processor circuitry 402, and a wireless interface 403. The Radio network node 400 may be configured to perform any of the methods disclosed in FIG. 3.

The Radio network node 400 is configured to communicate with a wireless device, such as the wireless device 500 disclosed herein, using a wireless communication system. The wireless interface 403 is configured for wireless communications via a wireless communication system, such as a 3GPP system, such as a 3GPP system supporting positioning of the wireless device.

The Radio network node 400 is configured to perform (e.g. via the processor circuitry 402 or via a measuring circuitry 402A) a first positioning procedure of the wireless device in a first frequency allocation.

The Radio network node 400 is configured to receive (e.g. via the wireless interface 403 or via the receiving circuitry 402B), from a network node, a set of resources to be used for a second positioning measurement in a second frequency allocation. The set of resources for the second positioning measurement may have been determined based on the first positioning procedure, and are thus associated with the measurement result from the first positioning measurement.

The Radio network node 400 is configured to perform (e.g. via the processor circuitry 402 or via the measuring circuitry 402A) the second positioning procedure of the wireless device in the second frequency allocation using the set of resources received from the network node.

The Radio network node 400 may be configured to send (e.g. via the wireless interface 403 or via a sending circuitry 402C), to the network node, measurement results indicative of the first positioning procedure of the wireless device in the first frequency allocation.

The Radio network node 400 may further be configured to send (e.g. via the wireless interface 403 or via the sending circuitry 402C), to the network node, a resource configuration of the Radio network node.

The wireless interface 403 is configured to communicate with the wireless device using wireless communications systems such as cellular systems (e.g. Narrowband IoT, e.g. low cost Narrowband IoT or category M).

The processor circuitry 402 is optionally configured to perform any of the operations disclosed in FIG. 3. The operations of the Radio network node 400 may be embodied in the form of executable logic routines (e.g., lines of code, software programs, etc.) that are stored on a non-transitory computer readable medium (e.g., the memory circuitry 401) and are executed by the processor circuitry 402).

Furthermore, the operations of the Radio network node 400 may be considered a method that the Radio network node 400 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 403. The memory circuitry 401 may exchange data with the processor circuitry 402 over a data bus. Control lines and an address bus between the memory circuitry 401 and the processor circuitry 402 also may be present (not shown in FIG. 6). The memory circuitry 401 is considered a non-transitory computer readable medium.

The memory circuitry 401 may be configured to store measurement results, information indicative thereof and/or resource configurations in a part of the memory based on the received software data.

FIG. 7 shows a block diagram of an exemplary wireless device 500 according to the disclosure. The wireless device 500 comprises a memory circuitry 501, a processor circuitry 502, and a wireless interface 503. The wireless device 500 may be configured to perform any of the methods disclosed in FIG. 2.

The wireless device 500 is configured to communicate with a radio network node, such as the radio network node 400 disclosed herein, using a wireless communication system. The wireless interface 503 is configured for wireless communications via a wireless communication system, such as a 3GPP system, such as a 3GPP system supporting positioning of the wireless device.

The wireless device is configured to perform (e.g. via the processor circuitry 502 or via a measuring circuitry 502A) a first positioning procedure in a first frequency allocation.

The wireless device is configured to receive (e.g. via the wireless interface 503 or via a receiving circuitry 502B), from a network node, a set of resources to be used for a second positioning measurement in a second frequency allocation. The set of resources has been determined based on the first positioning procedure.

The wireless device is configured to perform (e.g. via the processor circuitry 502 or via the measuring circuitry 502A) a second positioning procedure in the second frequency allocation using the set of resources received from the network node.

The wireless device may be configured to send (e.g. via the wireless interface 503 or via the sending circuitry 502C), to the network node, measurement results indicative of a first position obtained by the first positioning procedure of the wireless device in the first frequency allocation.

The wireless device may be configured to receive (e.g. via the wireless interface 503 or via the receiving circuitry 502B), from the network node, assistance data determined based on the measurement results indicative of the first positioning procedure.

The wireless device may be configured to perform (e.g. via the processor circuitry 502 or via the measuring circuitry 502A) the second positioning procedure in the second frequency allocation further based on assistance data received from the network node.

The wireless interface 503 is configured to communicate with the radio network node using wireless communications systems such as cellular systems (e.g. Narrowband IoT, e.g. low cost Narrowband IoT or category M).

The processor circuitry 502 is optionally configured to perform any of the operations disclosed in FIG. 4. The operations of the wireless device 500 may be embodied in the form of executable logic routines (e.g., lines of code, software programs, etc.) that are stored on a non-transitory computer readable medium (e.g., the memory circuitry 501) and are executed by the processor circuitry 502).

Furthermore, the operations of the wireless device 500 may be considered a method that the wireless device 500 is configured to carry out. Also, while the described functions and operations may be implemented in software, such functionality may as well be carried out via dedicated hardware or firmware, or some combination of hardware, firmware and/or software.

The memory circuitry 501 may be one or more of a buffer, a flash memory, a hard drive, a removable media, a volatile memory, a non-volatile memory, a random access memory (RAM), or other suitable device. In a typical arrangement, the memory circuitry 501 may include a non-volatile memory for long term data storage and a volatile memory that functions as system memory for the processor circuitry 503. The memory circuitry 501 may exchange data with the processor circuitry 502 over a data bus. Control lines and an address bus between the memory circuitry 501 and the processor circuitry 502 also may be present (not shown in FIG. 7). The memory circuitry 501 is considered a non-transitory computer readable medium.

The memory circuitry 501 may be configured to store resource configurations and measurement results in a part of the memory based on the received software data.

Figure 8:
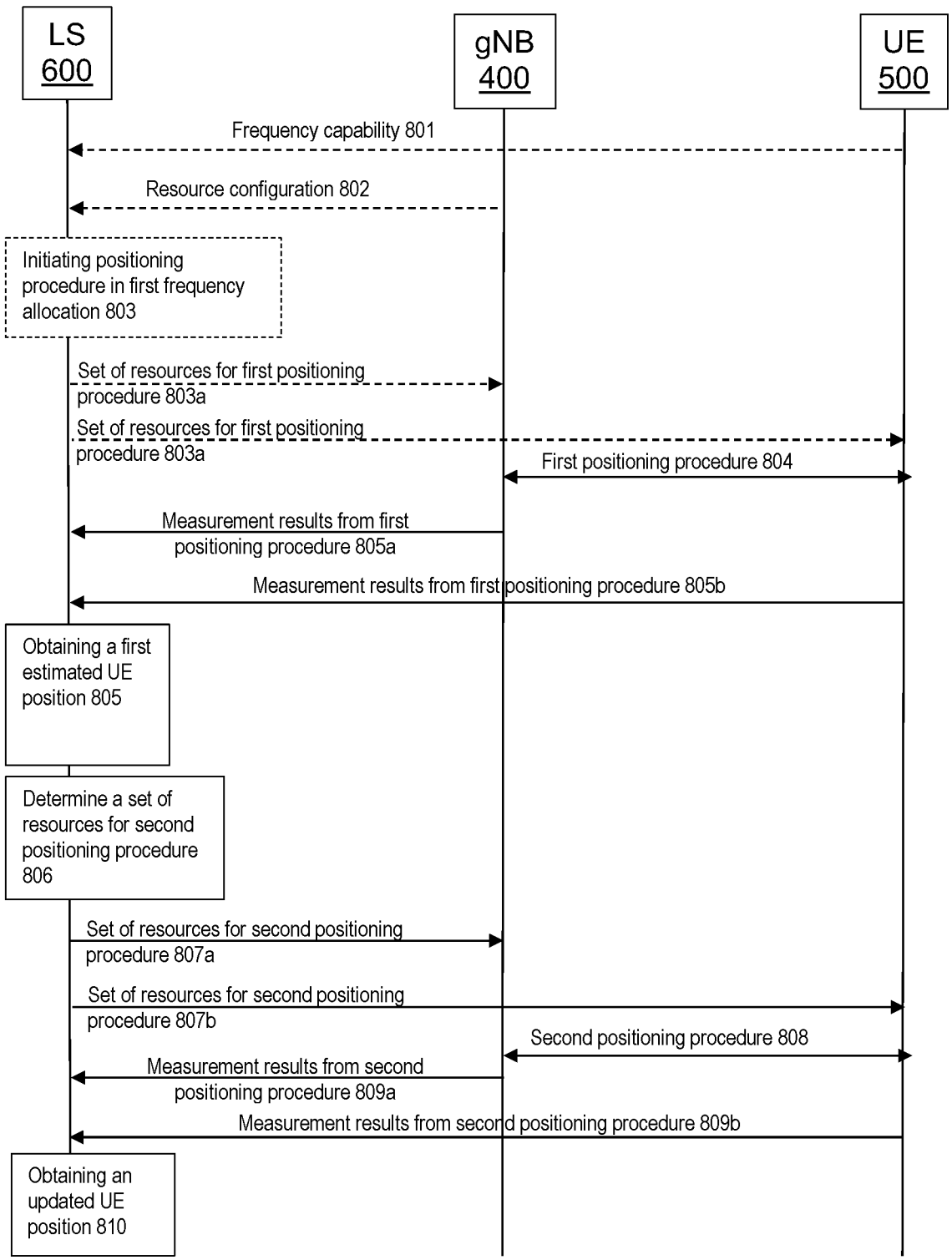
FIG. 8 is a signalling diagram illustrating an exemplary procedure for handling positioning of a wireless device.

FIG. 8 is a signaling diagram 500 illustrating an exemplary message exchange between an exemplary wireless device 500, such as a UE, an exemplary radio network node 400, such as a gNB, and an exemplary network node 600, such as a LS, during an exemplary positioning procedure.

In FIG. 8, the wireless device 500 may signal 801 to the network node 600 and/or the Radio network node 400 the frequency capability of the wireless device 500. The frequency capability shall herein be interpreted as the frequency allocations, such as frequency ranges and/or frequency layers that the wireless device supports.

The radio network node 400 and the wireless device 500 may provide 802 its resource configuration to the network node 600, as disclosed in S101 of FIGS. 2 and S201 of FIG. 3. The resource configuration of the radio network node may comprise the reference signal configuration of the radio network node for different frequency allocations, and the association of the reference signal configurations for the different frequency allocations. The reference signal may be a PRS.

The network node 600 may initiate 803 a first positioning procedure of the wireless device 500 in a first frequency allocation. The positioning procedure of the wireless device 500 may be initiated by sending 803a a first set of resources to be used for the positioning procedure to the radio network node 400 and to the wireless device 500.

The radio network node 400 and the wireless device 500 perform 804 a first positioning procedure in the first frequency allocation, as disclosed in S203 of FIG. 3 and S301 of FIG. 4. The positioning procedure may either be performed in DL or in UL.

The network node 600 obtains 805 the first approximate position of the wireless device 500, as disclosed in S103 of FIG. 2. The first approximate position of the wireless device 500 may be obtained by the network node 600 by receiving measurement results indicative of a first position obtained by the first positioning procedure of the wireless device in the first frequency allocation, sent 805a from the radio network node 400 and/or sent 805b from the wireless device 500, as disclosed in S204 of FIGS. 3 and S302 of FIG. 4.

The network node 600 determines 806, based on the first approximate position of the wireless device, a set of resources to be used for the second positioning procedure in the second frequency allocation, as disclosed in S105 of FIG. 2.

The network node 600 initiates the second positioning procedure by sending 807a, 807b the set of resources to be used for the second positioning procedure in the second frequency allocation to the radio network node 400 and the wireless device 500, as disclosed in S107 and S107A of FIG. 2. The set of resources may comprise one or more network nodes and/or transmit beams for transmitting reference signals for the positioning of the wireless device 500. Resources in the second frequency allocation covering the approximate position of the wireless device 500 during the first positioning procedure may e.g. be selected for performing the second positioning procedure for the wireless device 500. The set of resources sent from the network node 600 may further comprise assistance data. The assistance data may indicate a time delay and a delay spread of the measured signal that may be used for the second positioning procedure in the second frequency allocation to increase detection performance and speed of the positioning procedure for the wireless device. The assistance data may assist the measuring devices in the selection of spatial filters and transmission settings for performing the second positioning procedure.

The radio network node 400 and/or the wireless device 500 perform 808 a second positioning procedure in the second frequency allocation using the set of resources received from the network node in 807a and 807b, as disclosed in S205 of FIG. 3 and S305 of FIG. 4. The positioning procedure may either be performed in DL or in UL. The wireless device 500 performs positioning measurement in case of DL based positioning. The radio network 400 performs positioning measurement in case of UL based positioning.

The radio network node 400 may send 809a or the wireless device 500 may send 809b measurement results indicative of a second position of the wireless device obtained by the second positioning procedure in the second frequency allocation as disclosed in S209 of FIG. 3 and S307 of FIG. 4. The wireless device 500 sends positioning measurement in case of DL based positioning. The radio network 400 sends positioning measurement in case of UL based positioning.

The network node 600 obtains 810 an updated position of the wireless device 500 based on the second positioning procedure, as disclosed in S109 of FIG. 2. The updated position may be obtained by receiving the measurement results indicative of the second positioning procedure in the second frequency allocation, and determining the updated position of the wireless device based on the measurement results from the second positioning procedure, as disclosed in S109A and S109B of FIG. 2.

Embodiments of methods and products (network node, radio network node and wireless device) according to the disclosure are set out in the following items:

Item 1: A method, performed by a network node, for handling positioning of a User equipment, wireless device, wherein the method comprises:
  obtaining (S103) a first approximate position of the wireless device, based on a first positioning procedure for the wireless device in a first frequency allocation,
  determining (S105), based on the first approximate position of the wireless device, a set of resources to be used for a second positioning procedure in a second frequency allocation,
  initiating (S107) the second positioning procedure in the second frequency allocation using the determined set of resources, and
  obtaining (S109) an updated position of the wireless device based on the second positioning procedure.

Item 2: The method according to item 1, wherein the obtaining (S103) the first approximate position of the wireless device comprises:
  receiving (S103A), from a measuring device, measurement results indicative of the first positioning procedure for the wireless device in the first frequency allocation, and estimating (S103B), based on the received measurement results, the first position of the wireless device.

Item 3: The method according to item 1 or 2, wherein the obtaining (S109) the updated position comprises:
receiving (S109A), from a measuring device, measurement results indicative of the second positioning procedure in the second frequency allocation, and
determining (S109B) an updated position of the wireless device based on the measurement results from the second positioning procedure.

Item 4: The method according to any of the items 1 to 3, wherein the second frequency allocation is different than the first frequency allocation.

Item 5: The method according to item 4, wherein the second frequency allocation comprises higher frequencies and/or a wider bandwidth than the first frequency allocation.

Item 6: The method according to any of the previous items, wherein the method further comprises:
receiving (S101), from a radio network node (400) or the wireless device (500) configured to transmit reference signals for the positioning procedure, a resource configuration of the radio network node (400) or the wireless device (500), comprising a first set of resources for the first positioning procedure in the first frequency allocation, and further comprising
a second set of resources for the second positioning procedure in the second frequency allocation.

Item 7: The method according to item 6, wherein the method further comprises receiving an association of the first set of resources on the first frequency allocation and the second set of resources on the second frequency allocation.

Item 7a: The method according to item 6 or 7, wherein the reference signal is a positioning reference signal, PRS, and the resource configuration is a PRS configuration of the radio network node for different frequency allocations.

Item 8: The method according to item 7 or 7a, wherein the resource configurations are associated based on a geographical area covered by the resource configurations.

Item 9: The method according to any of the previous items, wherein the set of resources is associated with one or more radio network nodes, and/or with one or more beams of the measuring device.

Item 10: The method according to any of the previous items, wherein the initiating (S107) a positioning measurement in the second frequency allocation using the determined set of resources comprises:
sending (S107A), to a device configured to transmit reference signals during the positioning procedure, an indication of the set of resources to be used for positioning procedures in the second frequency allocation.

Item 10A: The method according to item 10, wherein the sending (S107A), comprises sending the indication of the set of resources to be used for positioning procedures in the second frequency allocation to the measuring device.

Item 10B: The method according to any of the previous items, wherein the second positioning procedure is initiated within a preconfigured time gap from the first positioning procedure.

Item 11: A method, performed by a radio network node, for handling positioning of a User equipment, wireless device, the method comprising:
performing (S203) a first positioning procedure of the wireless device in a first frequency allocation,
receiving (S205), from a network node, a set of resources to be used for a second positioning measurement in a second frequency allocation, wherein the set of resources are associated with a result of the first positioning procedure, and
performing (S207) the second positioning procedure of the wireless device in the second frequency allocation using the set of resources received from the network node.

Item 12: The method according to Item 11, wherein the second positioning procedure is performed within a preconfigured time gap from the first positioning procedure.

Item 13: The method according to item 11 or 12, wherein the method further comprises:
sending (S204), to the network node, measurement results indicative of the first positioning procedure of the wireless device in the first frequency allocation.

Item 14: The method according to any of the previous items 11 to 13, wherein the method further comprises:
sending (S201), to the network node, a resource configuration of the Radio network node.

Item 15: The method according to item 14, wherein the resource configuration of the Radio network node comprises a positioning reference signal, PRS, configuration of the Radio network node for different frequency allocations, and an association of the PRS configurations for the different frequency allocations.

Item 16: The method according to item 15, wherein the PRS configurations are associated based on a geographical area covered by the PRS configurations.

Item 17: A method, performed in a wireless device, for handling positioning of the wireless device, the method comprising:
performing (S301) a first positioning procedure in a first frequency allocation,
receiving (S303), from a network node, a set of resources to be used for a second positioning measurement in a second frequency allocation, wherein the set of resources are associated with a result of the first positioning procedure,
performing (S305) a second positioning procedure in the second frequency allocation using the set of resources received from the network node.

Item 18: The method according to item 17, wherein the method further comprises:
sending (S302), to the network node, measurement results indicative of a first position obtained by the first positioning procedure of the wireless device in the first frequency allocation.

Item 19: The method according to item 17 or 18, wherein the second positioning procedure is performed within a preconfigured time gap from the first positioning procedure.

Item 20: The method according to any of the previous items 17 to 19, wherein the method further comprises:
receiving (S204), from the network node, assistance data determined based on the measurement results indicative of the first positioning procedure.

Item 21: The method according to item 20, wherein the performing (S305) the second positioning procedure comprises:
performing (S305A) the second positioning procedure in the second frequency allocation further based on assistance data received from the network node.

Item 22. A network node comprising a memory circuitry, a processor circuitry, and a wireless interface, wherein the wireless device is configured to perform any of the methods according to any of the items 1-10B.

Item 23: A radio network node comprising a memory circuitry, a processor circuitry, and a wireless interface, wherein the radio network node is configured to perform any of the methods according to any of the items 11-16.

Item 24: A wireless device comprising a memory circuitry, a processor circuitry, and a wireless interface, wherein the wireless device is configured to perform any of the methods according to any of the items 17-21.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-10 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

APPENDIX A

3GPP TSG RAN WG1 Meeting #99  R1-1912360

Reno, USA, November 18th – 22nd, 2019

Agenda Item: 7.2.10.1

Source: Sony

Title: Remaining issues on DL PRS design for NR Positioning

Document for: Discussion / Decision

---

1. Introduction

In RAN plenary #83, a new work item "NR positioning support" was approved [1] . In RAN1 #98 [2] , the following selected agreements related to DL positioning reference signals were made:

Agreement:

- Start PRB parameter for DL PRS configuration has granularity of one PRB with a minimum of 0 and a maximum of [2176] PRBs.
- 4 PRB granularity is used for DL PRS BW configuration
- Maximum BW for DL PRS in PRBs does not exceed 272 PRBs
- Minimum BW for DL PRS in PRBs is not less than 24 PRBs
- The DL-PRS-Point A can take values given by ARFCN-ValueNR
- Rename "frequency layer" to "positioning frequency layer" in previous agreements for positioning in Rel-16
- In the agreements made in RAN1 related to NR positioning, a "positioning frequency layer" is a collection of DL PRS Resource Sets across one or more TRPs which have
  - the same SCS and CP type
  - the same centre frequency
  - the same point-A (already agreed)
  - FFS: details on configured BW

- Parameter DL-PRS-ResourceRepetitionFactor is configured for a DL PRS Resource Set and controls how many times each DL-PRS Resource is repeated for a single instance of the DL-PRS Resource Set
  - Values: 1, 2, 4, 6, 8, 16, 32
- Parameter DL-PRS-ResourceTimeGap is configured for a DL-PRS Resource Set
  - DL-PRS-ResourceTimeGap indicates offset in units of slots between two repeated instances of a DL PRS Resource corresponding to the same DL-PRS Resource ID within a single instance of the DL PRS Resource Set
  - DL-PRS-ResourceTimeGap is provided only if DL-PRS-ResourceRepetitionFactor is configured and is greater than 1
  - Values: 1, 2, 4, 8, 16, 32
- The time duration spanned by one DL PRS Resource set containing repeated DL PRS Resources should not exceed DL-PRS-Periodicity
- Note: UE RX beam sweeping is up to UE implementation

- A bitmap for DL PRS muting is configured for a DL PRS Resource Set. The following options are supported for the applicability of the bitmap.
  - Option 1: Each bit in the bitmap corresponds to a configurable number of consecutive instances (in a periodic transmission of DL-PRS resource sets) of a DL-PRS Resource set
    - All DL-PRS Resources within a DL-PRS Resource Set instance are muted for a DL-PRS Resource Set instance that is indicated to be muted by the bitmap
  - Option 2:
    - Each bit in the bitmap corresponds to a single repetition index for each of the DL-PRS Resources within an instance of a DL-PRS Resource Set (The length of the bitmap is equal to DL-PRS-ResourceRepetitionFactor)
    - The above applies to all instances of the DL-PRS Resource Set that the above DL-PRS Resources are part of.
  - Bitmap size values: 2, 4, 8, 16, 32 bits
  - FFS: Configuration of bitmaps corresponding to both options at the same time to the UE

- An ID is defined that can be associated with multiple DL PRS Resource Sets associated with a single TRP.
  - This ID can be used along with a DL PRS Resource Set ID and a DL PRS Resources ID to uniquely identify a DL PRS Resource
  - Name can be defined by RAN2
- Each TRP should only be associated with one such ID
- DL PRS Resource IDs are locally defined within DL PRS Resource Set
- DL PRS Resource Set IDs are locally defined within TRP
- All DL PRS Resources of the DL PRS Resource Set have the same bandwidth
- A higher layer parameter, DL-PRS-SFN0-Offset, is configured
  - Defines time offset of the SFN0 slot 0 for given TRP with respect to SFN0 slot 0 of FFS for RAN2 WG 1) serving TRP or 2) serving cell 3) etc.
  - FFS values
- A higher layer parameter, DL-PRS-ResourceSetSlotOffset, is configured
  - Defines slot offset with respect to SFN slot 0 for a TRP where DL PRS Resource Set is configured (i.e. slot where the first DL PRS Resource of DL PRS Resource Set occurs)
  - Values: {0,1,..., DL-PRS-Periodicity-1}
- The previously defined higher layer parameter, DL-PRS-RstdReferenceInfo, is used as a reference to determine the higher layer parameters, DL-PRS-expectedRSTD and DL-PRS-expectedRSTD-uncertainty

In this contribution, we discuss our view on remaining issues related to design of downlink PRS for NR positioning.

2. Downlink PRS Configuration

In legacy LTE, DL PRS transmission is essentially a cell-specific type of signal. The DL PRS is configured based on cell ID and periodically transmitted with certain duration and periodicity. Furthermore, the positioning requirement in LTE is only to fulfil the regulatory requirements. It has been identified that NR positioning requires to fulfil both regulatory and commercial requirements. The requirements can be differed in terms of positioning accuracy in vertical / horizontal and also the latency requirements. Various UEs in a cell may have different positioning requirements. Considering these aspects, it would be beneficial to have two operating NR positioning modes.

The first operation mode is a cell-specific positioning where the gNB transmits DL PRS with certain duration and periodicity. This is almost similar as DL PRS in LTE, except DL PRS in NR needs to at least consider the transmit/receive beam operation. We can expect all the UEs in at least a cell know the DL PRS configuration. Furthermore, we can consider the cell-specific DL PRS is designed to fulfil at least the regulatory requirements.

The second operation mode is a UE-specific positioning where the gNB may transmits an aperiodic UE-specific DL PRS. This is particularly for the case in supporting stringent positioning commercial requirement. We can expect a UE that requires higher positioning accuracy can be allocated with additional or more DL-PRS allocation. The scheduling information of the DL PRS is only informed to a designated UE or group of UEs.

Proposal 1: Support the operation of cell-specific and UE-specific DL PRS signals.

In RAN1 #98bis, it was agreed to support positioning frequency layer. NR is designed to support lean carrier operation. The transmission of periodic signals, such as CRS in LTE has been avoided in NR. The only periodic and broadcast transmission in NR is the SSB transmission. SSB has an important role such as time/frequency measurement, cell detection, etc. The SSB is also only transmitted with a short burst within 5 MHz bandwidth. In contrast, DL-PRS has a specific purpose for UE positioning measurement. DL-PRS may be transmitted with a wider bandwidth for improving positioning measurement accuracy. We consider, the gNB has a flexibility to enable / disable DL-PRS transmission in order to support lean carrier operation, particularly in the case where there is no demand of positioning service in a specific time/location. The operation of NR positioning frequency layer can facilitate this operation. The DL-PRS in an entire NR frequency layer can be disabled/enabled by the gNB. The gNB can broadcast this information to the UE.

Proposal 2: NR positioning frequency layer can be activated / deactivated by the gNB.

It was also agreed to define an ID that can be associated with multiple DL PRS Resource Sets. We consider this ID can be used to represent an ID of the frequency layer.

Proposal 3: NR positioning frequency layer has an ID.

A gNB can be configured to transmit PRS with more than one PRS resource set. Furthermore, it can be transmitted in different frequency layer/range. The configuration of each PRS resource set can be different in term of resource allocation, numerology, and the transmit beam operation. The transmission of PRS with 2 different PRS resource sets are illustrated below. Here, each DL-PRS resource is transmitted to cover certain areas. Furthermore, DL-PRS resource can be transmitted targeting to cover smaller areas (i.e using narrower beam) in order to improve positioning estimation accuracy. The transmission of such DL-PRS to cover multiple smaller areas may consume more resources (i.e multiple PRS resources). Hence, it may not always be transmitted all the times. On the other hand, the DL-PRS transmission with DL-PRS resource set 1 (left) may not require excessive resources and the gNB can periodically transmit such PRS. In order to make the UE aware of the configuration of the transmitted DL-PRS with resource set 2, it would be beneficial to provide relationship or association among PRS resource and/or resource set. The association can be in a form of QCL information of one DL-PRS resource(s) / resource-sets to another DL-PRS resource(s) / resource-sets.

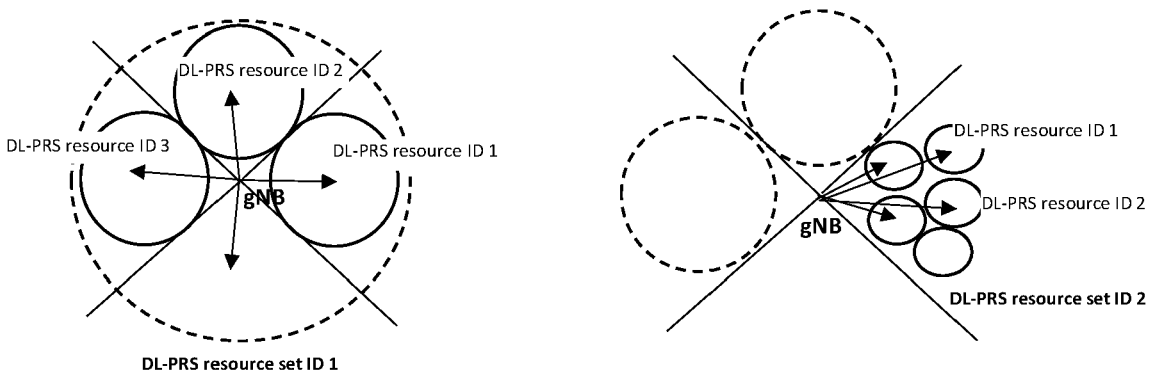

Figure 1: Illustration of DL-PRS transmission with multiple resource sets

Proposal 4: Support associations among DL-PRS resources and/or DL-PRS resource-sets.

In legacy NR release 15, it is well-known that the gNB transmits synchronization signal and reference signals (SSB, CSI-RS, TRS). These signals have some specific purposes. SSB is designed to assist the UE for synchronization and cell detection purposes. CSI-RS is to support channel state measurement. TRS as a kind of CSI-RS is also designed for the time/frequency tracking purpose. SSB transmission bandwidth is also relatively limited (5 MHz). Thus, those signals are not designed for positioning measurement purpose. The UE should have a freedom to utilize those signals for positioning purpose. It may provide some benefits, such as improving the accuracy. It may also give an extra burden for the UE, such as increasing UE power consumption, in case the UE uses those legacy signals for positioning purpose in addition to the DL-PRS. We consider it is up to UE implementation whether to use the legacy signals for positioning measurement purpose. However, those legacy signal can be used to assist positioning measurement using DL-PRS, such as QCL-assumption of DL-PRS to the legacy reference signals.

Proposal 5: The usage of legacy signals (SSB, CSI-RS, TRS) for positioning measurement purpose is up to UE implementation.

3. Conclusion

In this contribution, we discussed our view on DL reference signals for NR positioning. We have made the following proposals:

Proposal 1: Support the operation of cell-specific and UE-specific DL PRS signals.

Proposal 2: NR positioning bandwidth part can be activated / deactivated by the gNB.

Proposal 3: NR positioning frequency layer has an ID.

Proposal 4: Support associations among DL-PRS resources and/or DL-PRS resource-sets.

Proposal 5: The usage of legacy signals (SSB, CSI-RS, TRS) for positioning measurement purpose is up to UE implementation.

4. References

[1]        RP-190752, "New WID: NR Positioning Support"
[2]        RAN1 Meeting #98bis Chairman Notes

The invention claimed is:

1. A method, performed by a network node, for handling positioning of a wireless device, the method comprising:
   receiving, from a device configured to transmit reference signals for a positioning procedure, a resource configuration of the device configured to transmit reference signals, comprising a first set of resources for a first positioning procedure in a first frequency allocation and a second set of resources for a second positioning procedure in a second frequency allocation, wherein the resource configuration comprises a positioning reference signal (PRS) configuration based on an association of the first set of resources on the first frequency allocation and the second set of resources on the second frequency allocation;
   obtaining a first approximate position of the wireless device, based on a first positioning procedure for the wireless device in the first frequency allocation;
   determining, based on the association and the obtained first approximate position of the wireless device, a set of resources to be used for a second positioning procedure in the second frequency allocation;
   initiating the second positioning procedure in the second frequency allocation using the determined set of resources; and
   obtaining an updated position of the wireless device based on the second positioning procedure.

2. The method according to claim 1, wherein the obtaining the first approximate position of the wireless device comprises:
   receiving, from a measuring device, measurement results indicative of the first positioning procedure for the wireless device in the first frequency allocation and
   estimating, based on the received measurement results, the first position of the wireless device.

3. The method according to claim 1, wherein the obtaining the updated position comprises:
   receiving, from a measuring device, measurement results indicative of the second positioning procedure in the second frequency allocation; and
   determining an updated position of the wireless device based on the measurement results from the second positioning procedure.

4. The method according to claim 1, wherein the second frequency allocation is different than the first frequency allocation.

5. The method according to claim 4, wherein the second frequency allocation comprises higher frequencies and/or a wider bandwidth than the first frequency allocation.

6. The method according to claim 1, wherein the second positioning procedure is initiated within a preconfigured time gap from the first positioning procedure.

7. The method according to claim 1, wherein the resource configuration is associated based on a geographical area covered by the resource configurations.

8. The method according to claim 1, wherein the set of resources is associated with one or more radio network nodes, and/or with one or more beams of the measuring device.

9. The method according to claim 1, wherein the device configured to transmit reference signals for a positioning procedure comprises a radio network node or a wireless device.

10. The method according to claim 1, wherein the initiating a positioning measurement in the second frequency allocation using the determined set of resources comprises:
    sending, to the device configured to transmit reference signals during the positioning procedure, an indication of the set of resources to be used for positioning procedures in the second frequency allocation.

11. The method according to claim 10, wherein the sending, comprises sending the indication of the set of resources to be used for positioning procedures in the second frequency allocation to the measuring device.

12. A network node comprising a memory circuitry, a processor circuitry, and a wireless interface, wherein the wireless device is configured to perform the method of claim 1.

13. A method, performed in a radio network node, for handling positioning of a wireless device, the method comprising:
    performing a first positioning procedure of the wireless device in a first frequency allocation of a first set of resources;
    receiving, from a network node, a set of resources comprising a positioning reference signal (PRS) configuration to be used for a second positioning measurement in a second frequency allocation, wherein the set of resources is associated with the first positioning procedure, and
    performing the second positioning procedure of the wireless device in the second frequency allocation using the set of resources received from the network node.

14. The method according to claim 13, wherein the second positioning procedure is performed within a preconfigured time gap from the first positioning procedure.

15. The method according to claim 13, wherein the method further comprises:
    sending, to the network node, measurement results indicative of the first positioning procedure of the wireless device in the first frequency allocation.

16. The method according to claim 13, wherein the method further comprises:
    sending, to the network node, a resource configuration of the radio network node.

17. The method according to claim 16, wherein the PRS configuration of the radio network node comprises a PRS configuration of the radio network node for different frequency allocations, and an association of the PRS configurations for the different frequency allocations.

18. A radio network node comprising a memory circuitry, a processor circuitry, and a wireless interface, wherein the radio network node is configured to perform the method of claim 13.

19. A method, performed in a wireless device, for handling positioning of the wireless device, the method comprising:
    performing a first positioning procedure in a first frequency allocation of a first set of resources;
    receiving, from a network node, a set of resources comprising a positioning reference signal (PRS) configuration to be used for a second positioning measurement in a second frequency allocation, wherein the set of resources are associated with the first positioning procedure, and
    performing a second positioning procedure in the second frequency allocation using the set of resources received from the network node.

20. A wireless device comprising a memory circuitry, a processor circuitry, and a wireless interface, wherein the wireless device is configured to perform the method according to claim 19.

* * * * *